(12) United States Patent
Weckerle

(10) Patent No.: US 9,545,747 B2
(45) Date of Patent: Jan. 17, 2017

(54) SYSTEM FOR INJECTION MOLDING AND RELATED METHOD

(71) Applicant: MANN+HUMMEL GMBH, Ludwigsburg (DE)

(72) Inventor: Rick Weckerle, Portage, MI (US)

(73) Assignee: MANN+HUMMEL GMBH, Ludwigsburg (DE)

( * ) Notice: Subject to any disclaimer, the term of this patent is extended or adjusted under 35 U.S.C. 154(b) by 726 days.

(21) Appl. No.: 13/757,819

(22) Filed: Feb. 3, 2013

(65) Prior Publication Data

US 2014/0217650 A1    Aug. 7, 2014

(51) Int. Cl.

| B29C 49/70 | (2006.01) |
|---|---|
| B29C 49/06 | (2006.01) |
| B29C 45/33 | (2006.01) |
| B29C 45/43 | (2006.01) |
| B29L 31/00 | (2006.01) |

(52) U.S. Cl.
CPC ............ *B29C 49/70* (2013.01); *B29C 45/332* (2013.01); *B29C 45/435* (2013.01); *B29C 49/06* (2013.01); *B29L 2031/703* (2013.01)

(58) Field of Classification Search
None
See application file for complete search history.

(56) References Cited

U.S. PATENT DOCUMENTS

| 3,545,718 | A | * | 12/1970 | Shale | .................. | B29C 45/2614 |
|---|---|---|---|---|---|---|
| | | | | | | 249/184 |
| 3,752,436 | A | * | 8/1973 | Deutsch | ................ | B22D 17/24 |
| | | | | | | 249/145 |
| 4,520,991 | A | * | 6/1985 | Letica | .................... | B29C 45/36 |
| | | | | | | 249/122 |
| 4,753,413 | A | * | 6/1988 | Haigh | ..................... | B29C 33/48 |
| | | | | | | 249/122 |
| 5,536,161 | A | * | 7/1996 | Smith | ................... | B29C 33/444 |
| | | | | | | 249/58 |
| 5,824,256 | A | * | 10/1998 | Ballester | ............. | B29C 45/4407 |
| | | | | | | 264/318 |
| 7,153,125 | B2 | * | 12/2006 | Evans | ................. | B29C 45/2614 |
| | | | | | | 425/392 |

(Continued)

FOREIGN PATENT DOCUMENTS

DE    3043275 A1    7/1982

*Primary Examiner* — Monica Huson
(74) *Attorney, Agent, or Firm* — James Hasselbeck

(57) ABSTRACT

A system for injection molding a part includes a plate, first and second primary mold slides, first and second secondary mold slides and at least a first core post. The first and second primary mold slides define an exterior of a first portion of a molded part and are movable relative to each other between an open position and a closed position. The first and second secondary mold slides define an exterior of a second portion of the molded part and are movable relative to each other between an open position and a closed position. A first core post defines an interior of the first portion of the molded part. The first and second secondary mold slides are operative to secure the molded part as the first and second primary mold slides are moved from their closed position to their open position, as the molded part is expanded under a source of pressurized air and as the first core post is withdrawn from an interior of the molded part.

12 Claims, 7 Drawing Sheets

(56) References Cited

U.S. PATENT DOCUMENTS

| | | | |
|---|---|---|---|
| 7,160,497 B2 * | 1/2007 | Krantz | B29C 33/485 264/328.11 |
| 2004/0247726 A1 * | 12/2004 | Takemoto | B29C 33/44 425/190 |
| 2005/0098295 A1 * | 5/2005 | Dubay | B22D 17/24 164/312 |
| 2006/0125149 A1 | 6/2006 | Takada et al. | |

* cited by examiner

US 9,545,747 B2

SYSTEM FOR INJECTION MOLDING AND RELATED METHOD

FIELD

The present disclosure relates to injection molding. More particularly, the present disclosure relates to a system for injection molding a part. The present disclosure also relates to a method for injection molding a part.

BACKGROUND

This section provides background information related to the present disclosure which is not necessarily prior art.

Various arrangements are well known in the art for the injection molding of parts. Injection molding is a process for producing parts from materials such as thermoplastics and thermosetting plastics. Raw materials (e.g., plastic granules) are fed into a hopper for deliver to a heated barrel. The raw materials are heated within the barrel to a flowable state. A screw or similar device forces the flowable material into a mold cavity. The flowable material is allowed to at least partially cool and thereby at least partially harden within the mold cavity to a desired configuration.

Depending on the part complexity, a mold cavity may be conventionally defined by one or more mold slides and one or more core posts. These moveable components of known injection molding arrangements may be automatically controlled for purposes of reducing manual labor and thereby reducing or eliminating human error. If practical, it is generally desirable to also automate of removing the molded part from the mold cavity.

While known injection molding arrangements have proven to be successful for their intended purposes, a continuous need in the pertinent art remains. For example, injection molded parts of various geometries still conventionally require a degree of human interaction for purposes of removing the molded part from the mold cavity.

SUMMARY

This section provides a general summary of the disclosure, and is not a comprehensive disclosure of its full scope or all of its features.

In accordance with one particular aspect, the present teachings provide a system for injection molding a part. The system includes a plate, first and second primary mold slides, first and second secondary mold slides and at least a first core post. The first and second primary mold slides define an exterior of a first portion of a molded part and are movable relative to each other between an open position and a closed position. The first and second secondary mold slides define an exterior of a second portion of the molded part and are movable relative to each other between an open position and a closed position. A first core post defines an interior of the first portion of the molded part. The first and second secondary mold slides are operative to secure the molded part as the first and second primary mold slides are moved from their closed position to their open position, as the molded part is expanded under a source of pressurized air and as the first core post is withdrawn from an interior of the molded part.

In accordance with another particular aspect, the present teachings provide a system for injection molding a hollow, cylindrical part. The system includes first and second primary mold slides and a first core post for cooperatively defining a first portion of a mold cavity. The first portion of the mold cavity forms a first axial end of the part and a convoluted bellows section of the part. The system additionally includes first and second secondary mold slides and a second core post for cooperatively defining a second portion of the mold cavity. The second portion forms a second axial end of the part. The system further includes a control arrangement for automatically forming the part and releasing the part from the system such that the control arrangement radially expands the convoluted bellows section of the part while the first and second secondary mold slides clamp the second axial end of the part.

In accordance with yet another particular aspect, the present teachings provide a method of injection molding a hollow, cylindrical part with an injection molding system. The injection molding system includes first and second primary mold slides movable relative to one another between closed and open positions, first and second secondary mold slides movable relative to one another between closed and open positions and at least one core post. The method includes defining a mold cavity with the first and second primary mold slides, the first and second secondary mold slides and the at least one core post and introducing a flowable material into the mold cavity to form the molded part. The method additionally includes moving the first and second primary mold slides to their open positions while maintaining the first and second secondary mold slides in their closed positions to clamp a portion of the part and radially expanding the molded part with a source of pressurized air. The method further includes moving the first and secondary mold slides to their open positions to unclamp the part.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
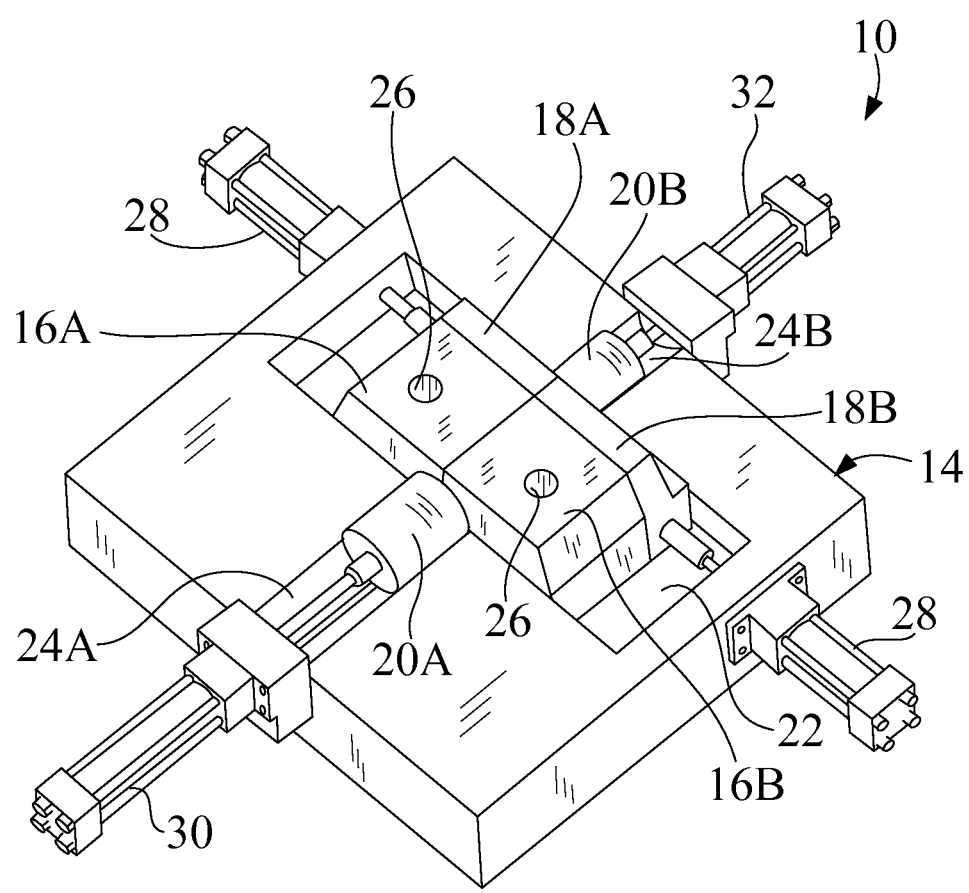
FIG. 1 is a perspective view of a system for injection molding a part, the system shown with first and second primary mold slides in closed positions and first and second secondary mold slides in closed positions.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

With general reference to the drawings, a system for injection molding a part in accordance with the present teachings is illustrated and generally identified at reference character 10. The system 10 is shown operatively associated with an exemplary molded part 12 in the simplified schematic views of FIGS. 2A and 2B. The molded part 12 is shown removed from the system 10 and in more detail in FIG. 6. The remaining figures are illustrated with the molded part removed for purposes of illustration.

Figure 6:
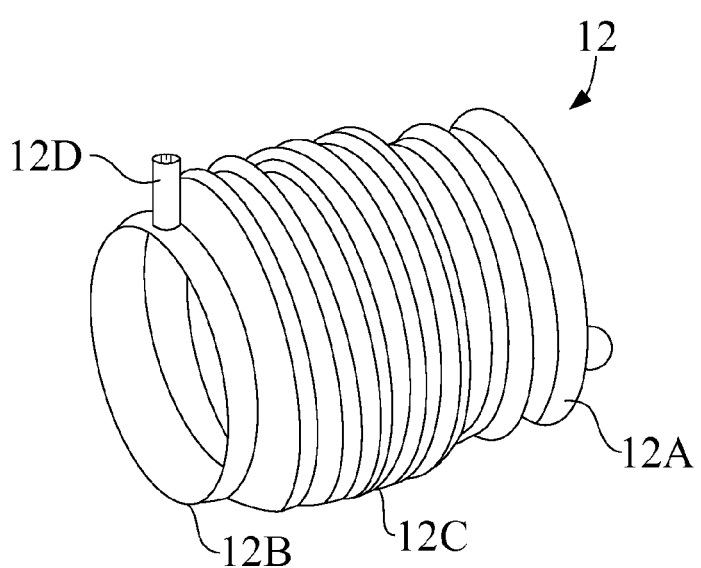
FIG. 6 is a perspective view of the molded part schematically shown in FIGS. 2A and 2B.

With particular reference to FIG. 6, the molded part 12 shown in the drawings will be described. In the exemplary embodiment, the molded part 12 is a convoluted part that may be used as a flexible ducting. As illustrated, the molded part 12 is a relatively thin-walled, hollow structure having a first axial end 12A, a second axial end 12B and at least one locked or undercut section contrary to the typical de-molding direction. In the embodiment illustrated, the at least one locked or undercut section is a bellows section 12C. The bellows section 12C positioned between the first and second ends 12A and 12B. In one particular application, the molded part 12 may have a length of approximately 140 mm and a diameter of approximately 70 mm. It will be understood by those of ordinary skill in the art that the present teachings may be readily adapted for making various types of injection molded parts including injection molded parts of different sizes and different complexities. In this regard, the present teachings are not limited for making the exemplary molded part 12 shown in the drawings.

In the embodiment illustrated, the injection molding system 10 of the present teachings is generally shown to include a plate 14, first and second primary mold slides 16A and 16B, first and second secondary mold slides 18A and 18B and at least one core post. In certain embodiments, the system 10 may include more than one set of primary mold slides. As shown, the at least one core post includes a first core post 20A and a second core post 20B. It will be understood that the system may include a greater or lesser number of mold slides or a greater or lesser number of core posts within the scope of the present teachings.

The plate or base 14 will be understood to be conventional insofar as the present teachings are concerned. The plate 14 defines a cavity or recess 22 for accommodating the first and second primary mold slides 16A and 16B and the first and second secondary mold slides 18A and 18B. The plate 14 additionally includes first and second channels 24A and 24B for accommodating the first and second core posts 20A and 20B, respectively.

The first and second primary mold slides 16A and 16B cooperate to define an exterior of a first portion of a molded part 12. In the embodiment illustrated, the exterior portion of the molded part 12 defined by the first and second primary mold slides 16A and 16B extends from the first end 12A and includes the entire convoluted bellows section 12C. In this regard, the first and second primary mold slides 16A and 16B include cooperating grooves for forming the exterior of the bellows section 12C.

Figure 2:
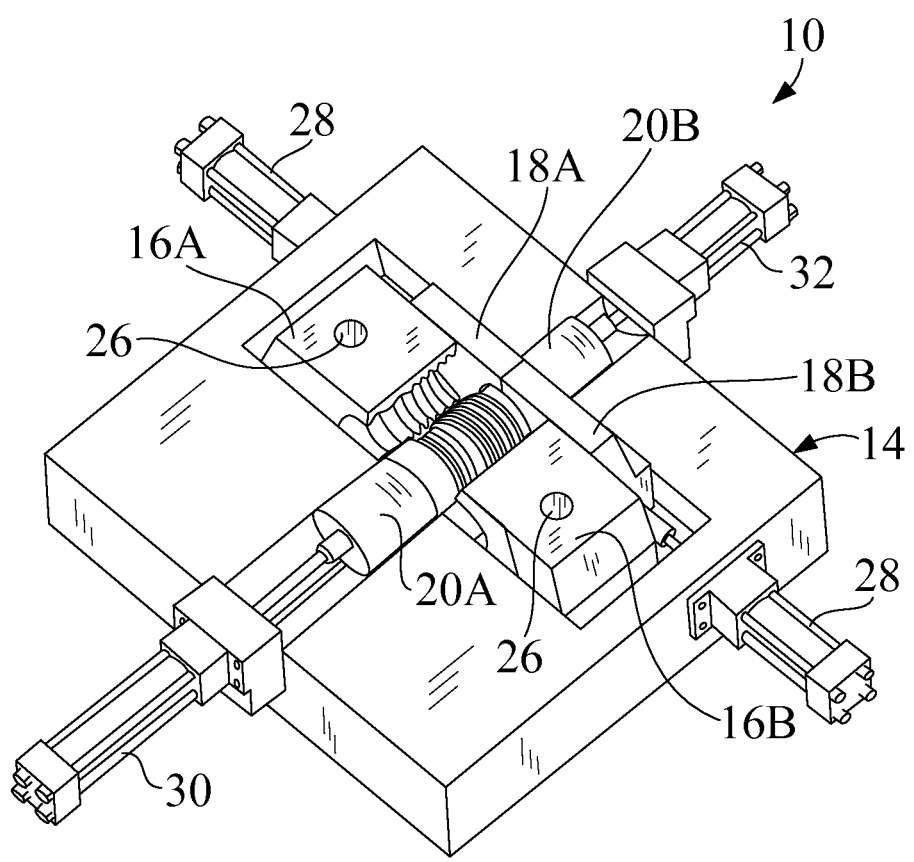
FIG. 2 is a perspective view similar to FIG. 1, the first and second primary slides shown moved to open or release positions.

The first and second primary mold slides 16A and 16B are movable relative to each other between a closed position and an open position. Closed positions are shown in FIG. 1, for example. Open positions are shown in FIG. 2, for example. In the embodiment illustrated, both of the first and second primary mold slides 16A and 16B are movable relative to the plate 14. In other applications, however, it may be necessary to only move one of the primary mold slides 16A or 16B such that there is relative movement therebetween.

The top surfaces of the first and second primary mold slides 16A and 16B are illustrated to include apertures 26. These apertures 26 are adapted to engage horn pins (not shown) that drive the first and second primary mold slides between their open and closed positions. It will be understood by those of ordinary skill in the art that the first and second primary mold slides may be alternatively driven between their open and closed positions by hydraulic cylinders or in any other manner known in the art. For example, other suitable mechanisms may include racks, air, electric servos, etc.

The first and second secondary mold slides define an exterior of a second portion of the molded part 12. In the embodiment illustrated, the exterior portion of the molded part 12 defined by the first and second secondary mold slides 18A and 18B includes the second end 12B thereof. As such, the molding surfaces of the first and second secondary mold slides 18A and 18B are smooth and arcuate. Other geometries, however, may be used within the scope of the present teachings. As will become more apparent below, the first and second secondary mold slides 18A and 18B may operate to clamp the molded part 12 during final forming of the molded part 12. In this manner, the first and second secondary mold slides (or clamp slides) 18A and 18B function as a primary retention feature for the molded part 12.

Figure 5:
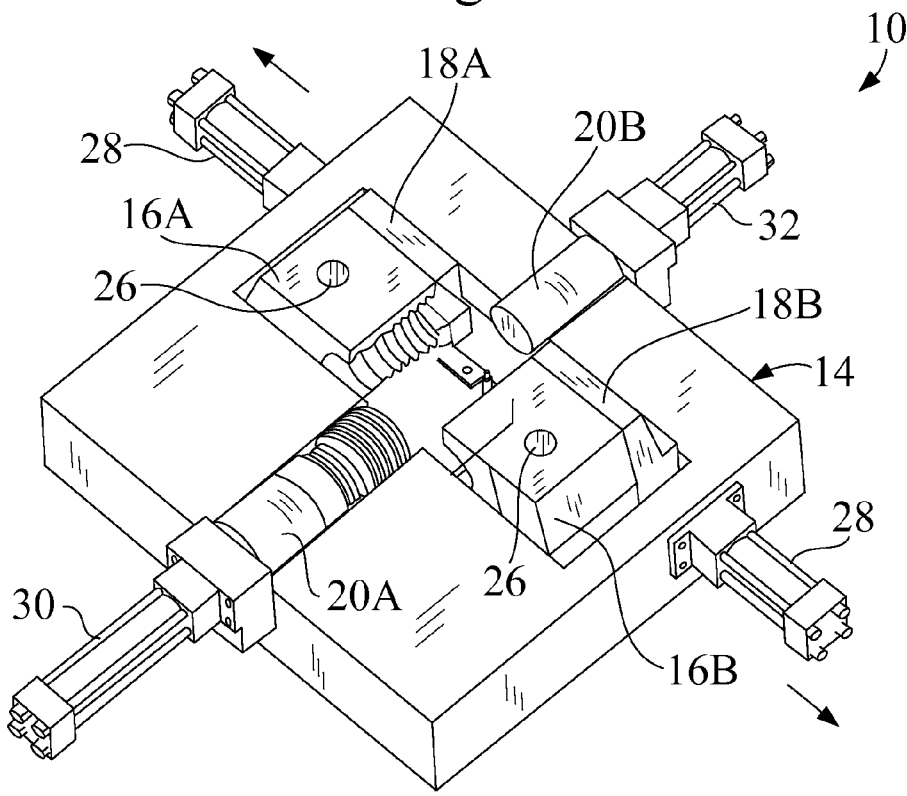
FIG. 5 is a perspective view similar to FIG. 4, the first and second secondary mold slides shown moved to open positions.

As with the first and second primary mold slides 16A and 16B, the first and second secondary mold slides 18A and 18B are similarly movable relative to each other between a closed position and an open position. Closed positions are shown in FIG. 1, for example. Open positions are shown in FIG. 5, for example. In the embodiment illustrated, both of the first and second secondary mold slides 18A and 18B are movable relative to the plate 14. In other applications, however, it may be necessary to only move one of the primary mold slides 18A or 18B such that there is relative movement therebetween.

In the embodiment illustrated, the secondary mold slides 18A and 18B are conventionally driven between their closed and open positions by hydraulic cylinders 28. Alternatively, the secondary mold slides 18A and 18B may be driven by horn pins or in any other manner well known in the art. Particular examples are discussed above with respect to the primary mold slides. In either case, however, the particular mechanism will be understood to be beyond the scope of the present invention.

The first core post 20A defines an interior of the first portion of the molded part. In the embodiment illustrated, the portion of the interior of the molded part 12 defined by the first core post 20A generally corresponds to the exterior portion defined by the first and second primary mold slides 16A and 16B. As such, the first core post 20A includes a ribbed portion for defining the bellows section 12C of the molded part 12C.

The first core post 20A is movable between a first position for molding the part 12 and a second position for releasing the part 12. The first position is shown in FIG. 2, for example. The second position is shown in FIG. 5, for example. In the embodiment illustrated, the first core post 20A is driven between the first and second positions by a hydraulic cylinder 30. The first core post 20A may be alternatively driven in any manner known in the art. Again, the particular mechanism is beyond the scope of the present teachings.

Figure 4:
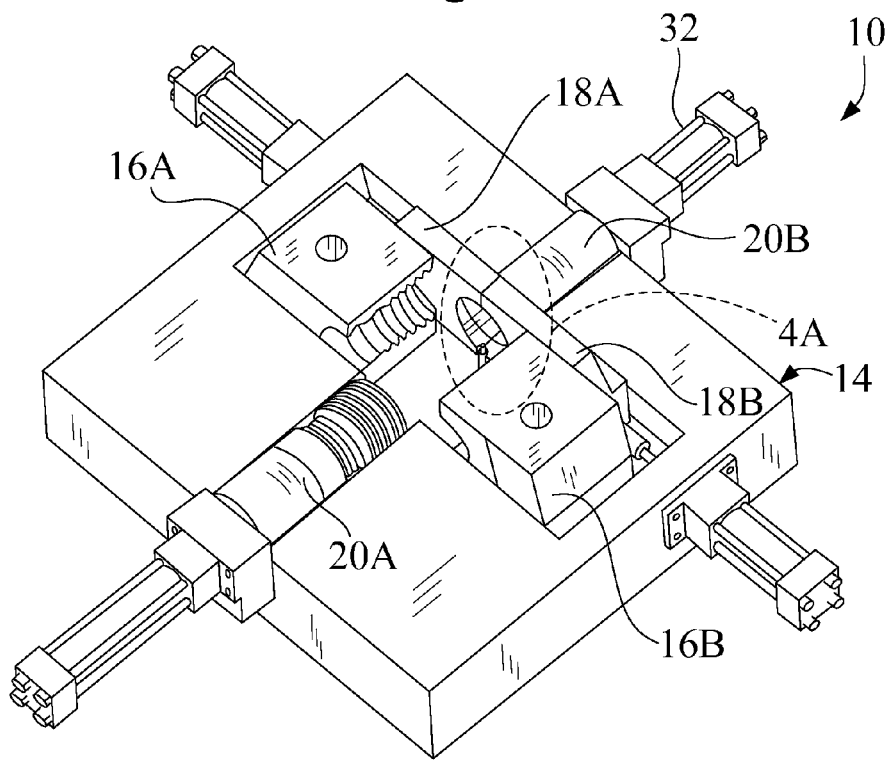
FIG. 4 is a perspective view similar to FIG. 3, the second core post also retracted from the molded part, the molded part again removed for purposes of illustration.

The second core post 20B is similarly movable between a first position for molding the part 12 and a second position for releasing the part 12. The first position is shown in FIG. 2, for example. The second position is shown in FIG. 4, for example. In the embodiment illustrated, the second core post 20B is driven between the first and second positions by a hydraulic cylinder 32. The second core post 20B may be alternatively driven in any manner known in the art.

Figure 4A:
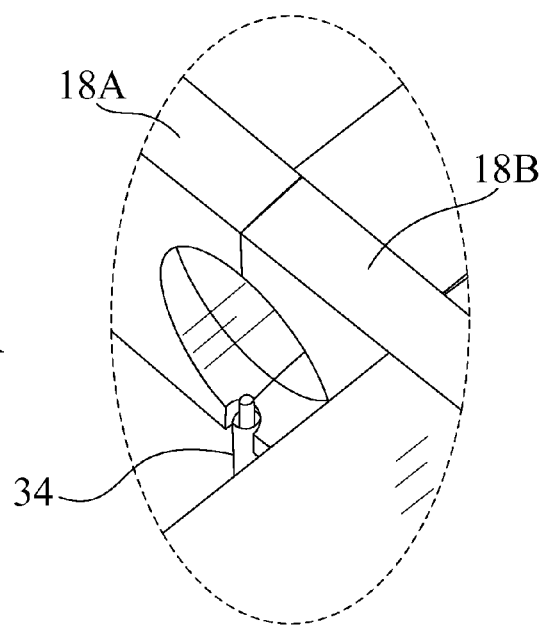
FIG. 4A is an enlarged view of the detail shown in circle 4A of FIG. 4.

In the embodiment illustrated, the system 10 may include a secondary retention feature in the form of a retention pin 34. The retention pin 34 is shown most clearly in the enlarged view of FIG. 4A and extends upward from a floor of the cavity 22 defined by the plate 14. The pin 34 is disposed at the intersection of the first and second secondary mold slides 18A and 18B. As illustrated, each of the first and second secondary mold slides 18A and 18B includes a cut-out portion. The cut-out portions generally define a hollow, half cylinder for accommodating the pin 34.

It will be understood that the first and second primary mold slides 16A and 16B, the first and second secondary mold slides 18A and 18B, and the first and second core posts 20A and 20B cooperate to define a mold cavity for forming the part 12. With the first and second primary mold slides 16A and 16B in their closed positions, the first and second secondary mold slides 18A and 18B in their closed positions, and the first and second core posts 20A and 20B in their first positions (as shown in FIG. 1), the mold cavity is ready raw material 36 (see FIG. 7) to form the part 12.

Figure 2A:
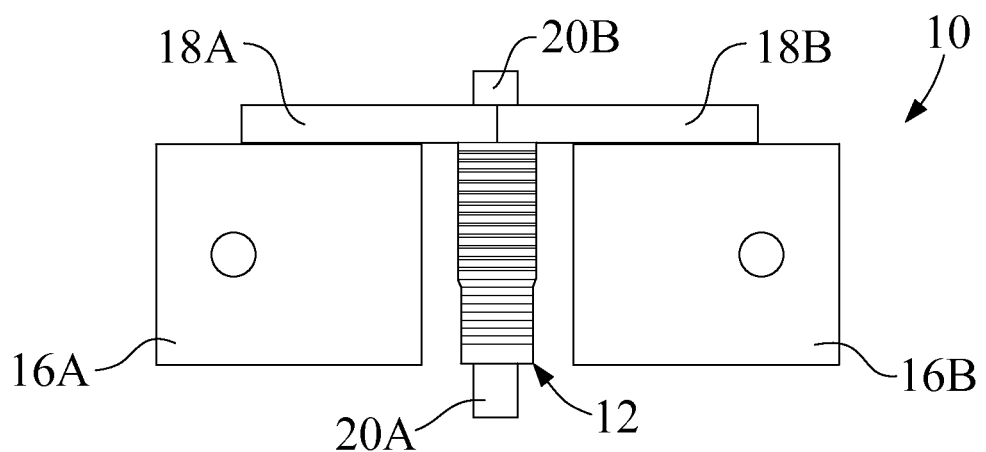
FIG. 2A is a simplified schematic view illustrating the primary mold slides and secondary mold slides in the positions of FIG. 2, additionally illustrating first and second core posts, and further illustrating a molded part formed about the first and second core posts.
Figure 2B:
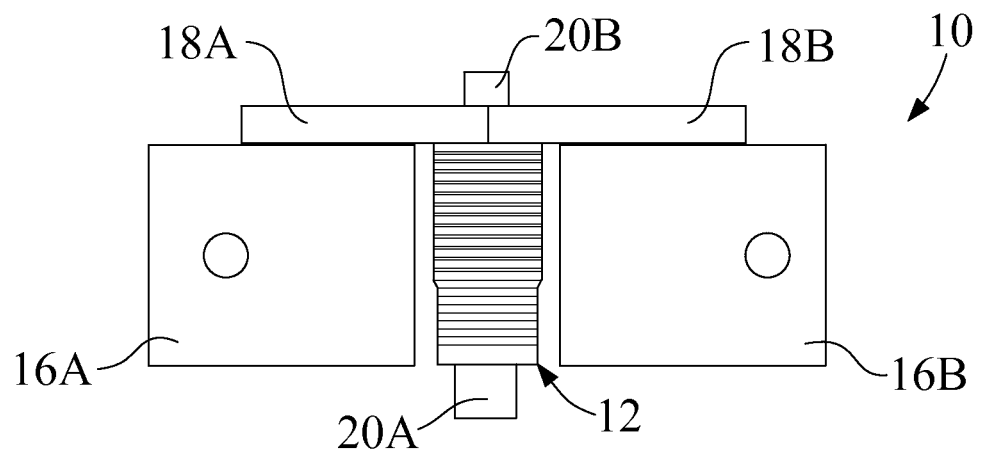
FIG. 2B is a simplified schematic view similar to FIG. 2A, the molded part shown radially expanded by a source of pressurized air to facilitate extraction of the first core post.

The flowable material is introduced into the mold cavity in a conventional manner. The material may be allowed to at least partially cool and set. As the material sufficiently cools and sets, the first and second primary mold slides 16A and 16B may be driven to their open position (see FIG. 2). For purposes of illustration, the molded part 12 is not shown in FIG. 2. The part, however, is shown in the simplified views of FIGS. 2A and 2B. In the views of FIGS. 2 and 2A-2B, the first and second secondary mold slides remain in their closed position and thereby clamp the molded part 12 relative to the plate 12.

A source of pressurized air 38 (see FIG. 7) may next be introduced to expand the molded part that has not yet completely set and therefore remains pliable. With the particular material used, expansion of the part may occur before or after complete cooling of the part. The unexpanded part (prior to the introduction of pressurized air) is shown in FIG. 2A. The expanded part (after the introduction of pressurized air) is shown in FIG. 2B. In the embodiment illustrated, the pressurized air radially expands the bellows section 12C of the partially cooled molded part 12 over the diametral interference of the rest of the part 12.

The air is provided from the exterior perimeter of the core post 20A to an interior channel provided to direct the air to the interior of the molded part 12. Air is released and turned off by the system controls at the appropriate time to provide less resistance to core post 20A removal thus preventing damage to the part 12.

Figure 3:
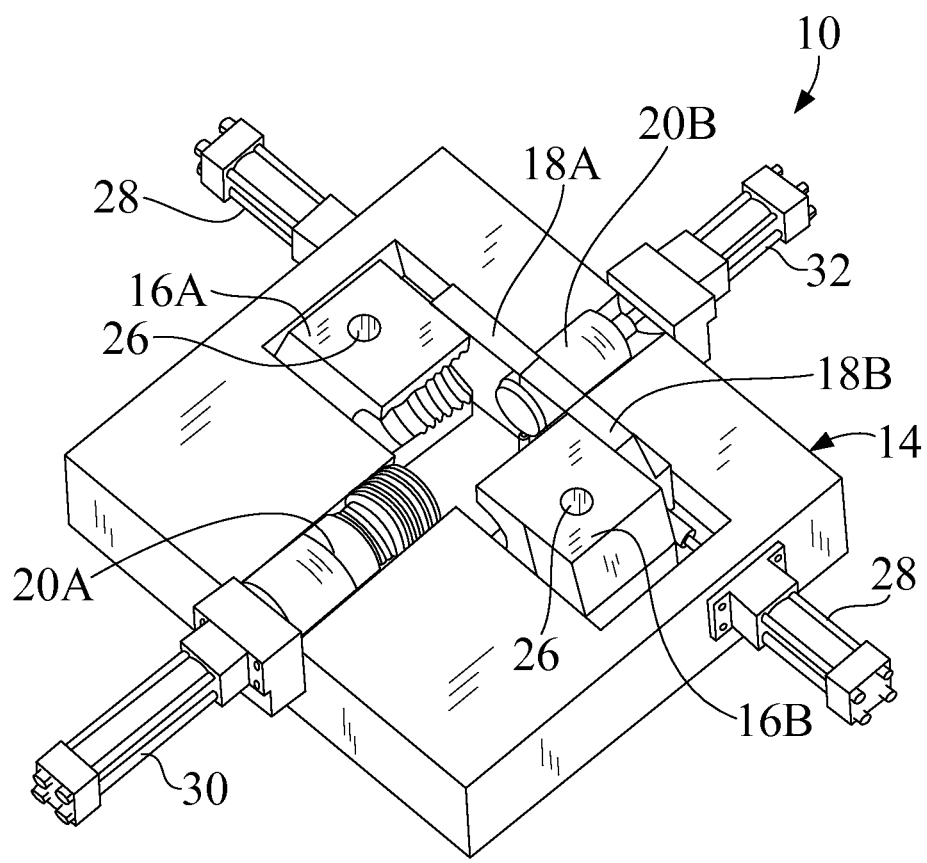
FIG. 3 is another perspective view similar to FIG. 2, the first core post shown retracted from the molded part, the molded part removed for purposes of illustration.

With the bellows section 12C of the molded part 12 radially expanded, the first core post 20A may be withdrawn from the molded part (as shown in FIG. 3) by the hydraulic cylinder 30 or similar mechanism In the embodiment illustrated, the first core post 20A is linearly withdrawn. The withdrawal, however, may also take an arcuate or other non-linear path. In this regard, the ridges of the first core post 18A will no longer prevent removal of the first core post 18A. While a little interference remains, the first core post 18A may none the less be withdrawn.

The molded part 12 is now ready to be released from the system 10. The second end of the part 12B is unclamped by moving the first and second secondary mold slides 18A and 18B to their open positions (as shown in FIG. 5). The second core post 20B may be withdrawn to its second position.

The molded part 12 is formed to include a secondary retention feature 12D (see FIG. 6) that radially surrounds the pin 34. Pressurized air may be introduced through the back of the plate 14 to blow the molded part 12 off the pin 34 and out of the mold. In this manner, the molded part 12 may be thrown from the system 10 to a conveyor or bin. The system 10 may use a robot or other automation to grasp and move the part to a designated area. In the embodiment illustrated, the secondary retention feature 12D is a portion of the final molded part and serves to receive a fastener. In other words, the secondary retention feature 12D may be trimmed from the molded part 12 during final processing.

Figure 7:
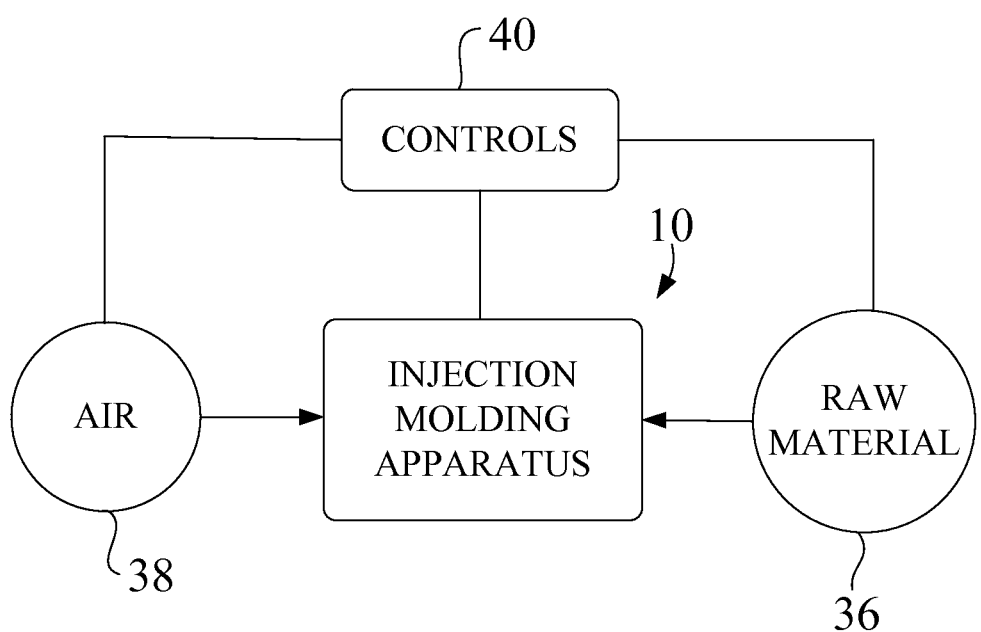
FIG. 7 is a schematic view illustrating the system of the present teachings with a controller.

As shown in the schematic view of FIG. 7, the system 10 of the present teachings may additionally include controls or a control arrangement 40 for automatically cycling the system 10 to form the molded part 12 and release the molded part 12 from the system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for injection molding a part, the system comprising:
   a plate;
   first and second primary mold slides defining an exterior of a first portion of a molded part, the first and second primary mold slides movable relative to each other between an open position and a closed position;
   first and second secondary mold slides defining an exterior of a second portion of the molded part, the first and second secondary mold slides movable relative to each other between an open position and a closed position, the first and secondary mold slides each having a plurality of grooves formed into the an inner mold surface in an interior of the first and second mold slides, the plurality of grooves configured to form an exterior of a ribbed convoluted bellows on the part to be molded; and a first core post defining an interior of the first portion of the molded part;

and insertable into, retractable from the interior of the first and second primarily mold slides, the first core post having a plurality of outwardly projecting ribs extending circumferentially about an outer surface of the first core post, the outwardly projecting ribs spaced apart from each other;

wherein the plurality of grooves are aligned with the plurality of outwardly projecting ribs to define the ribbed convoluted bellows therebetween;

wherein the first and second secondary mold slides are operative to secure the molded part as the first and second primary mold slides are moved from their closed position to their open position, wherein after injection molding completes and the part at least partially cools, the molded part is expanded under a source of pressurized air introduced into a region between the first core post and the interior of the molded part, the pressurized air expanding the ribbed convoluted bellows of the molded part on the first core post over the plurality of outwardly projecting ribs, enabling the first core post to be withdrawn from the interior of the molded part.

2. The system for injection molding a part of claim 1, further comprising
a second core post for defining an interior of the second portion of the part.

3. The system for injection molding a part of claim 1,
a retention pin upwardly extending from the plate at an intersection of the first and second secondary mold slides when the first and second secondary mold slides are in their closed positions.

4. The system for injection molding a part of claim 3, wherein
at least one of the first and second secondary mold slides includes a cut-away portion to accommodate the retention pin.

5. The system for injection molding a part of claim 3, wherein
the first and second secondary mold slides cooperate to define at least a portion of a hollow cylinder for accommodating the retention pin when the first and second secondary mold slides are in the closed positions.

6. The system for injection molding a part of claim 1, in combination with the source of pressurized air.

7. The system for injection molding a part of claim 1,
a control arrangement for automatically cycling the system to form the part and release the part from the system.

8. A system for injection molding a hollow part, the system comprising:
first and second primary mold slides and a first core post cooperatively defining a first portion of a mold cavity, the first portion for forming a first axial end of the part and at least one locked or undercut section contrary to a de-molding direction, the first and secondary mold slides each having a plurality of grooves formed into the an inner mold surface in an interior of the first and second mold slides, the plurality of grooves configured to form an exterior of a ribbed convoluted bellows on the hollow part;

wherein the first core post for defines an interior of the first portion of the molded hollow part, wherein the first core post is insertable into and retractable from an interior of the first and second primarily mold slides, the first core post having a plurality of outwardly projecting ribs extending circumferentially about an outer surface of the first core post, the outwardly projecting ribs spaced apart from each other;

wherein the plurality of grooves are aligned with the plurality of outwardly projecting ribs to define the ribbed convoluted bellows therebetween;

first and second secondary mold slides and a second core post cooperatively defining a second portion of the mold cavity, the second portion for forming a second axial end of the part; and a control arrangement for automatically forming the part and releasing the part from the system such that the control arrangement radially expands the convoluted bellows section of the part while the first and second secondary mold slides clamp the second axial end of the part;

wherein after injection molding completes and the part at least partially cools, the molded part is expanded under a source of pressurized air introduced into a region between the first core post and the interior of the molded part, expanding the part on the first core post enabling the first core post to be withdrawn from the interior of the molded part.

9. The system for injection molding a hollow part of claim 8, wherein
the first and second secondary mold slides are movable between clamped positions and release positions.

10. The system for injection molding a hollow part of claim 8,
a retention pin upwardly extending from the plate at an intersection of the first and second secondary mold slides when the first and second secondary mold slides are in their closed positions.

11. The system for injection molding a hollow part of claim 10, wherein
at least one of the first and second secondary mold slides includes a cut-away portion to accommodate the retention pin.

12. The system for injection molding a hollow part of claim 11, wherein
the first and second secondary mold slides cooperate to define at least a portion of a hollow cylinder for accommodating the retention pin when the first and second secondary mold slides are in the closed positions.

* * * * *